US012639849B2

(12) United States Patent
Nishiyama

(10) Patent No.: US 12,639,849 B2
(45) Date of Patent: May 26, 2026

(54) MAIN SUBJECT DETERMINING APPARATUS, IMAGE CAPTURING APPARATUS, MAIN SUBJECT DETERMINING METHOD, AND STORAGE MEDIUM

(71) Applicant: CANON KABUSHIKI KAISHA, Tokyo (JP)

(72) Inventor: Tomohiro Nishiyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 18/928,987

(22) Filed: Oct. 28, 2024

(65) Prior Publication Data

US 2025/0054187 A1 Feb. 13, 2025

Related U.S. Application Data

(63) Continuation of application No. 17/846,710, filed on Jun. 22, 2022, now Pat. No. 12,165,358, which is a (Continued)

(30) Foreign Application Priority Data

Oct. 29, 2019 (JP) ................................. 2019-196616

(51) Int. Cl.
 *G06T 7/73* (2017.01)
 *G06N 20/00* (2019.01)
 (Continued)

(52) U.S. Cl.
 CPC .............. *G06T 7/74* (2017.01); *G06N 20/00* (2019.01); *G06T 7/73* (2017.01); *G06V 10/25* (2022.01);
 (Continued)

(58) Field of Classification Search
 CPC ......... H04N 5/232127; H04N 5/23219; H04N 5/232; H04N 5/232121; H04N 5/23225; (Continued)

(56) References Cited

U.S. PATENT DOCUMENTS 7,130,454 B1 10/2006 Berube et al.
8,073,190 B2 12/2011 Gloudemans et al.
(Continued)

FOREIGN PATENT DOCUMENTS

JP 2001076149 A 3/2001
JP 2011-100175 A 5/2011
(Continued)

OTHER PUBLICATIONS

Joseph Redmon, et al., "You Only Look Once: Unified, Real-Time Object Detection", Proceedings of the IEEE conference on computer vision and pattern recognition, 2016, pp. 779-788, vol. 1, DOI Bookmark:10.1109/CVPR.2016.91.
(Continued)

*Primary Examiner* — Pritham D Prabhakher
(74) *Attorney, Agent, or Firm* — Cowan, Liebowitz & Latman, P.C.

(57) ABSTRACT

There is provided a main subject determining apparatus. A subject detecting unit detects a plurality of subjects from a first image. An obtaining unit obtains posture information of each of the plurality of subjects. For each of the plurality of subjects, a calculating unit calculates, on the basis of the posture information of the subject, a reliability corresponding to a likelihood that the subject is a main subject in the first image. A determining unit determines the main subject of the first image from among the plurality of subjects on the basis of the plurality of reliabilities calculated for the plurality of subjects.

20 Claims, 8 Drawing Sheets

Related U.S. Application Data continuation of application No. 17/080,445, filed on Oct. 26, 2020, now Pat. No. 11,394,870.

(51) Int. Cl.

| | |
|---|---|
| *G06V 10/25* | (2022.01) |
| *G06V 10/764* | (2022.01) |
| *G06V 10/82* | (2022.01) |
| *G06V 40/10* | (2022.01) |
| *G06V 40/20* | (2022.01) |
| *H04N 23/67* | (2023.01) |

(52) U.S. Cl.
CPC ............ *G06V 10/764* (2022.01); *G06V 10/82* (2022.01); *G06V 40/10* (2022.01); *G06V 40/20* (2022.01); *G06V 40/23* (2022.01); *H04N 23/671* (2023.01); *H04N 23/675* (2023.01)

(58) Field of Classification Search
CPC ... G06T 7/73; G06T 7/74; G06T 2207/20084; G06T 2207/10016; G06T 2207/10024; G06T 2207/30196; G06T 2207/20076; G06T 2207/20081; G06V 10/25; G06V 10/82; G06V 40/10; G06V 40/20; G06V 40/23; G06N 3/0454; G06N 3/0481; G06N 3/08; G06N 20/00; G06K 9/6271; G06K 9/6284
USPC .......................................................... 348/349
See application file for complete search history.

(56) References Cited

U.S. PATENT DOCUMENTS

| | | | | |
|---|---|---|---|---|
| 8,401,232 | B2 * | 3/2013 | Fan .......................... | G06T 7/215 |
| | | | | 600/407 |
| 8,477,998 | B1 | 7/2013 | Kim et al. | |
| 9,036,038 | B2 * | 5/2015 | Kimura .................. | H04N 23/73 |
| | | | | 348/222.1 |
| 9,323,991 | B2 | 4/2016 | Bernal | |
| 9,852,358 | B2 * | 12/2017 | Yamaoka ................ | G06F 18/22 |
| 10,281,979 | B2 * | 5/2019 | Oyama ................... | G06V 10/25 |
| 10,713,794 | B1 | 7/2020 | He et al. | |
| 11,074,711 | B1 | 7/2021 | Akbas et al. | |
| 11,144,766 | B2 | 10/2021 | Liu | |
| 11,238,612 | B2 * | 2/2022 | Ning .......................... | G06T 7/11 |
| 11,288,835 | B2 * | 3/2022 | Ning .......................... | G06T 7/73 |
| 2006/0018516 | A1 | 1/2006 | Masoud et al. | |
| 2011/0234854 | A1 * | 9/2011 | Kimura ................ | H04N 23/633 |
| | | | | 382/190 |
| 2011/0267344 | A1 * | 11/2011 | Germann ............... | G06V 20/64 |
| | | | | 382/154 |
| 2011/0274315 | A1 * | 11/2011 | Fan .......................... | G06T 7/277 |
| | | | | 382/103 |
| 2015/0031450 | A1 * | 1/2015 | Matsuura ............ | A63F 13/5258 |
| | | | | 463/31 |
| 2015/0035827 | A1 * | 2/2015 | Yamaoka ................ | G06T 17/00 |
| | | | | 345/420 |
| 2016/0055366 | A1 * | 2/2016 | Oyama ................... | G06F 3/013 |
| | | | | 345/522 |
| 2016/0114243 | A1 * | 4/2016 | Matsuura .............. | A63F 13/355 |
| | | | | 463/31 |
| 2017/0357877 | A1 | 12/2017 | Lin et al. | |
| 2018/0165548 | A1 | 6/2018 | Wang et al. | |
| 2018/0293753 | A1 * | 10/2018 | Varadarajan .............. | G06T 7/73 |
| 2019/0114804 | A1 | 4/2019 | Sundaresan et al. | |
| 2020/0074678 | A1 * | 3/2020 | Ning ..................... | G06V 20/42 |
| 2020/0137298 | A1 | 4/2020 | Eslami | |
| 2020/0160044 | A1 | 5/2020 | Sur et al. | |
| 2020/0193609 | A1 | 6/2020 | Dharur et al. | |
| 2021/0090284 | A1 | 3/2021 | Ning et al. | |

FOREIGN PATENT DOCUMENTS

| | | | |
|---|---|---|---|
| JP | 2012-070222 | A | 4/2012 |
| JP | 2013206273 | A | 10/2013 |
| JP | 2014033265 | A | 2/2014 |
| JP | 2016046642 | A | 4/2016 |
| JP | 2018066889 | A | 4/2018 |
| JP | 2019106631 | A | 6/2019 |
| WO | 2019012817 | A1 | 1/2019 |
| WO | 2020178876 | A1 | 9/2020 |

OTHER PUBLICATIONS

Zhe Cao, et al., "Realtime Multi-person 2D Pose Estimation Using Part Affinity Fields", Proceedings of the IEEE Conference on Computer Vision and Pattern Recognition, 2017, pp. 1302-1310, vol. 1, DOI Bookmark:10.1109/CVPR.2017.143.
The above foreign patent documents #3-8 were cited in the Sep. 1, 2023 Japanese Office Action, a copy of which is enclosed without an English Translation, that issued in Japanese Patent Application No. 2019-196616.

* cited by examiner

FIG. 7

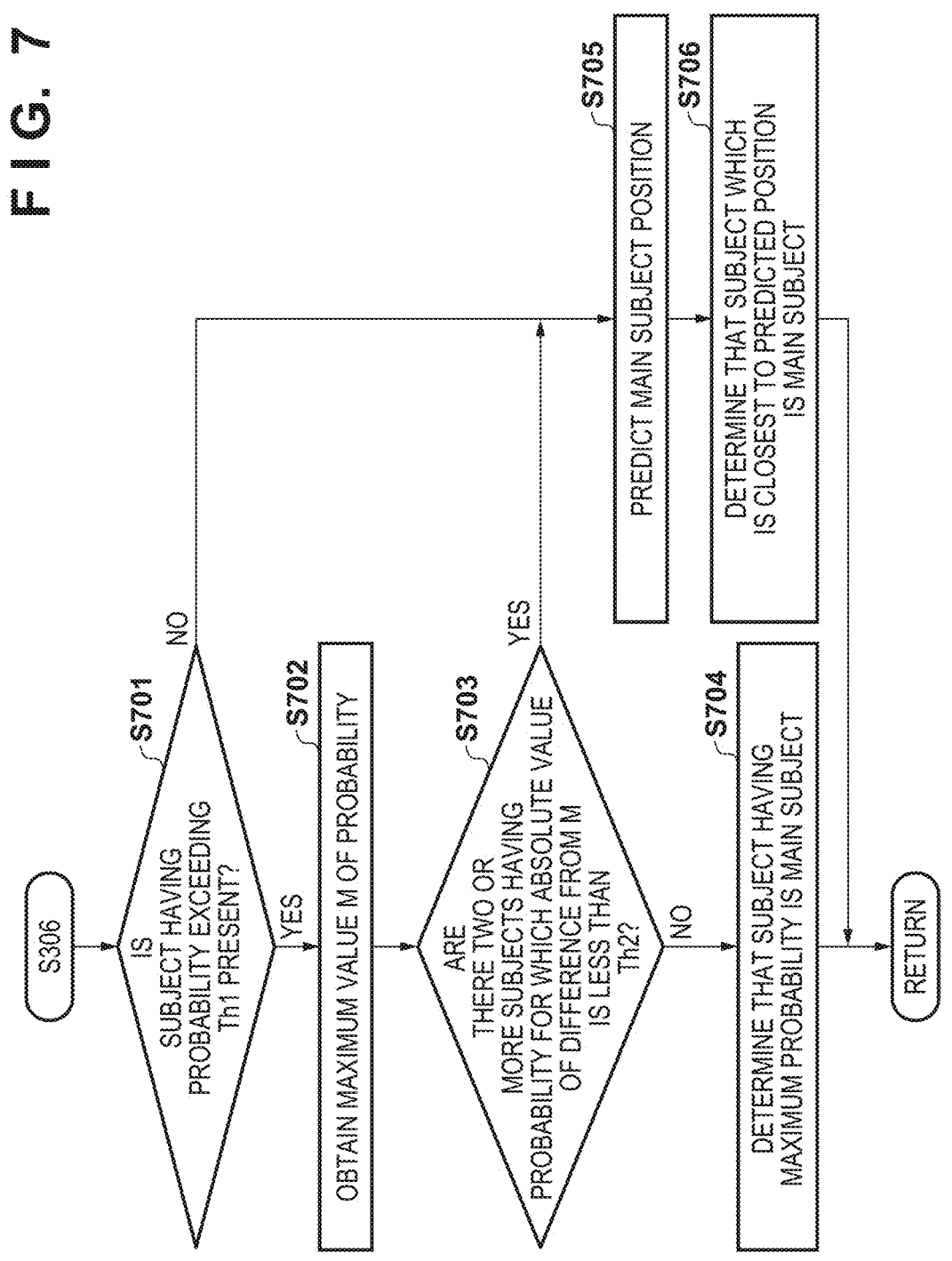

S306

S701
IS SUBJECT HAVING PROBABILITY EXCEEDING Th1 PRESENT?

NO →

YES

S702
OBTAIN MAXIMUM VALUE M OF PROBABILITY

S703
ARE THERE TWO OR MORE SUBJECTS HAVING PROBABILITY FOR WHICH ABSOLUTE VALUE OF DIFFERENCE FROM M IS LESS THAN Th2?

YES

NO

S704
DETERMINE THAT SUBJECT HAVING MAXIMUM PROBABILITY IS MAIN SUBJECT

S705
PREDICT MAIN SUBJECT POSITION

S706
DETERMINE THAT SUBJECT WHICH IS CLOSEST TO PREDICTED POSITION IS MAIN SUBJECT

RETURN

START

OBTAIN IMAGE — S301

DETECT UNIQUE OBJECT — S302

SET PROCESSING TARGET REGION — S801

DETECT SUBJECT (PERSON) — S303

OBTAIN POSTURE INFORMATION (JOINT POSITION) OF EACH SUBJECT — S304

CALCULATE RELIABILITY (PROBABILITY) OF EACH SUBJECT — S305

DETERMINE MAIN SUBJECT — S306

END

MAIN SUBJECT DETERMINING APPARATUS, IMAGE CAPTURING APPARATUS, MAIN SUBJECT DETERMINING METHOD, AND STORAGE MEDIUM

CROSS-REFERENCE TO RELATED APPLICATION

This application is a continuation of application Ser. No. 17/846,710, filed Jun. 22, 2022, which is a continuation of application Ser. No. 17/080,445, filed Oct. 26, 2020, the entire disclosures of which are hereby incorporated by reference.

BACKGROUND OF THE INVENTION

Field of the Invention

The present invention relates to a main subject determining apparatus, an image capturing apparatus, a main subject determining method, and a storage medium.

Description of the Related Art

Conventionally, in image capturing apparatuses such as digital cameras, various techniques have been proposed for performing image capturing control, such as autofocus (AF), by detecting a subject from an image. AF functions based on subject detection can assist a user in taking a shot by automating the selection of a rangefinding region.

Japanese Patent Laid-Open No. 2012-70222 discloses a technique in which a person's face is detected through pattern matching and tracked while keeping the in-focus position on the person's face. Additionally, as a motion recognition technique aimed at situations where a plurality of persons are present, Japanese Patent Laid-Open No. 2011-100175 discloses a technique in which a subject is detected on the basis of that subject having a feature amount pertaining to the trajectory of a person, such as a movement distance, which satisfies a specific condition, and the detected subject is then tracked.

However, in an image where a plurality of subjects are present, these past techniques cannot determine a main subject which is highly likely to match a user's intentions.

SUMMARY OF THE INVENTION

Having been achieved in light of such circumstances, the present invention provides a technique for determining, in an image where a plurality of subjects are present, a main subject which is highly likely to match a user's intentions.

According to a first aspect of the present invention, there is provided a main subject determining apparatus comprising at least one processor and/or at least one circuit which functions as: a subject detecting unit configured to detect a plurality of subjects from a first image; an obtaining unit configured to obtain posture information of each of the plurality of subjects; a calculating unit configured to, for each of the plurality of subjects, calculate, on the basis of the posture information of the subject, a reliability corresponding to a likelihood that the subject is a main subject in the first image; and a determining unit configured to determine the main subject of the first image from among the plurality of subjects on the basis of the plurality of reliabilities calculated for the plurality of subjects.

According to a second aspect of the present invention, there is provided an image capturing apparatus, comprising: the main subject determining apparatus according to the first aspect; and an image sensor, wherein the first image is an image captured by the image sensor.

According to a third aspect of the present invention, there is provided a main subject determining method executed by a main subject determining apparatus, comprising: detecting a plurality of subjects from a first image; obtaining posture information of each of the plurality of subjects; for each of the plurality of subjects, calculating, on the basis of the posture information of the subject, a reliability corresponding to a likelihood that the subject is a main subject in the first image; and determining the main subject of the first image from among the plurality of subjects on the basis of the plurality of reliabilities calculated for the plurality of subjects.

According to a fourth aspect of the present invention, there is provided a non-transitory computer-readable storage medium which stores a program for causing a computer to execute a main subject determining method comprising: detecting a plurality of subjects from a first image; obtaining posture information of each of the plurality of subjects; for each of the plurality of subjects, calculating, on the basis of the posture information of the subject, a reliability corresponding to a likelihood that the subject is a main subject in the first image; and determining the main subject of the first image from among the plurality of subjects on the basis of the plurality of reliabilities calculated for the plurality of subjects.

Further features of the present invention will become apparent from the following description of exemplary embodiments with reference to the attached drawings.

BRIEF DESCRIPTION OF THE DRAWINGS

FIG. 7 is a flowchart illustrating, in detail, processing of step S306 in FIG. 3, according to the second embodiment.

DESCRIPTION OF THE EMBODIMENTS

Figure 1:
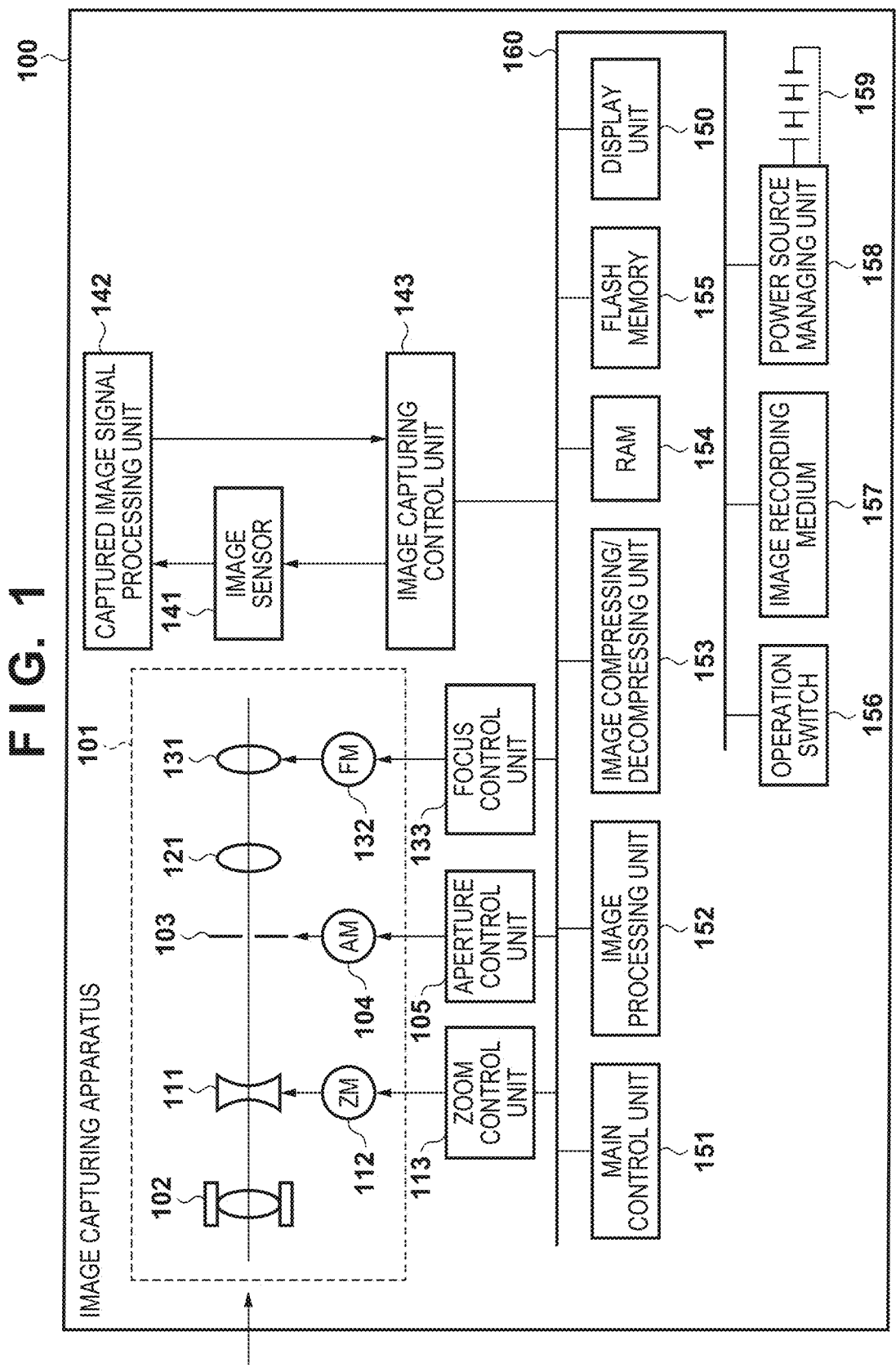
FIG. 1 is a block diagram illustrating the configuration of an image capturing apparatus 100 including a main subject determining apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Overall Configuration of Image Capturing Apparatus 100

FIG. 1 is a block diagram illustrating the configuration of an image capturing apparatus 100 including a main subject determining apparatus. The image capturing apparatus 100 is a digital still camera, a video camera, or the like which shoots a subject and records moving image or still image data to various types of media, such as tape, solid-state memory, an optical disk, a magnetic disk, or the like. However, the image capturing apparatus 100 is not limited thereto. As an example, the following will describe a case where the subject is a person. A "main subject" is assumed to be a subject which a user intends to be the target of image capturing control. Note that the configuration illustrated in FIG. 1 is merely one example of the configuration of the image capturing apparatus 100.

The various units in the image capturing apparatus 100 are connected over a bus 160. Each unit is controlled by a main control unit 151.

A lens unit 101 includes a fixed first group lens 102, a zoom lens 111, an aperture stop 103, a fixed third group lens 121, and a focus lens 131. An aperture control unit 105 adjusts the diameter of an opening in the aperture stop 103, to adjust an amount of light during shooting, by driving the aperture stop 103 via an aperture motor 104 (AM) in accordance with commands from the main control unit 151. A zoom control unit 113 changes a focal length by driving the zoom lens 111 via a zoom motor 112 (ZM). A focus control unit 133 determines a driving amount at which to drive a focus motor 132 (FM) on the basis of a shift amount in a focus direction of the lens unit 101. Additionally, the focus control unit 133 controls a focus adjustment state by driving the focus lens 131 via the focus motor 132 (FM). AF control is implemented by the focus control unit 133 and the focus motor 132 controlling the movement of the focus lens 131. The focus lens 131 is a lens for adjusting the focus. While the focus lens 131 is illustrated as a single lens in FIG. 1 for simplicity, the focus lens 131 is normally constituted by a plurality of lenses.

A subject image formed on an image sensor 141 via the lens unit 101 is converted into an electrical signal by the image sensor 141. The image sensor 141 is a photoelectric conversion element that photoelectrically converts the subject image (an optical image) into an electrical signal. Light-receiving elements constituted by m pixels in the horizontal direction and n pixels in the vertical direction are arranged in the image sensor 141. The image formed on the image sensor 141 and photoelectrically converted is processed into an image signal (image data) by a captured image signal processing unit 142. An image on an image capturing plane can be obtained as a result.

The image data output from the captured image signal processing unit 142 is sent to an image capturing control unit 143, and is temporarily held in RAM 154 (random access memory). The image data held in the RAM 154 is compressed by an image compressing/decompressing unit 153 and then recorded into an image recording medium 157. In parallel with this, the image data held in the RAM 154 is sent to an image processing unit 152.

The image processing unit 152 applies predetermined image processing to the image data held in the RAM 154. The image processing applied by the image processing unit 152 includes, but is not limited to, what is known as development processing, such as white balance adjustment processing, color interpolation (demosaicing) processing, and gamma correction processing, as well as signal format conversion processing, scaling processing, and the like. The image processing unit 152 also determines a main subject on the basis of posture information of the subject (e.g., joint positions), position information of an object unique to the scene (called a "unique object" hereinafter), and the like. The image processing unit 152 may use a result of this determination processing in other image processing (e.g., white balance adjustment processing). The image processing unit 152 stores the processed image data, the posture information of each of subjects, information of the position and size of the unique object, position information of the centroid, the face, and the pupils of the main subject, and the like in the RAM 154.

An operation switch 156 is an input interface including a touch panel, buttons, and the like, and can be used to perform various operations of the image capturing apparatus 100 by, for example, the user selecting various function icons displayed in a display unit 150.

The main control unit 151 includes one or more programmable processors such as CPUs or MPUs. The main control unit 151 implements the functions of the image capturing apparatus 100 by, for example, loading programs stored in flash memory 155 into the RAM 154 and executing the programs to control the various units of the image capturing apparatus 100. The main control unit 151 also executes AE processing, which automatically determines exposure conditions (shutter speed or accumulation time, aperture value, and sensitivity) on the basis of information on the luminance of the subject. The information on the luminance of the subject can be obtained from the image processing unit 152, for example. The main control unit 151 can also determine the exposure conditions on the basis of a specific subject region, such as a person's face, for example.

The focus control unit 133 performs AF control with respect to the position of the main subject stored in the RAM 154. The aperture control unit 105 controls the exposure using a luminance value of a specific subject region.

The display unit 150 displays images, a main subject detection result, and the like. A battery 159 is managed as appropriate by a power source managing unit 158, and provides a stable supply of power to the image capturing apparatus 100 as a whole. Control programs necessary for the image capturing apparatus 100 to operate, parameters used in the operations of the various units, and the like are recorded in the flash memory 155. When the image capturing apparatus 100 is started up in response to a user operation (i.e., when the apparatus transitions from a power off state to a power on state), the control programs, parameters, and the like stored in the flash memory 155 are partially loaded into the RAM 154. The main control unit 151 controls the operations of the image capturing apparatus 100 in accordance with control programs, constants, and the like loaded into the RAM 154.

Main Subject Determination Processing

Figure 2:
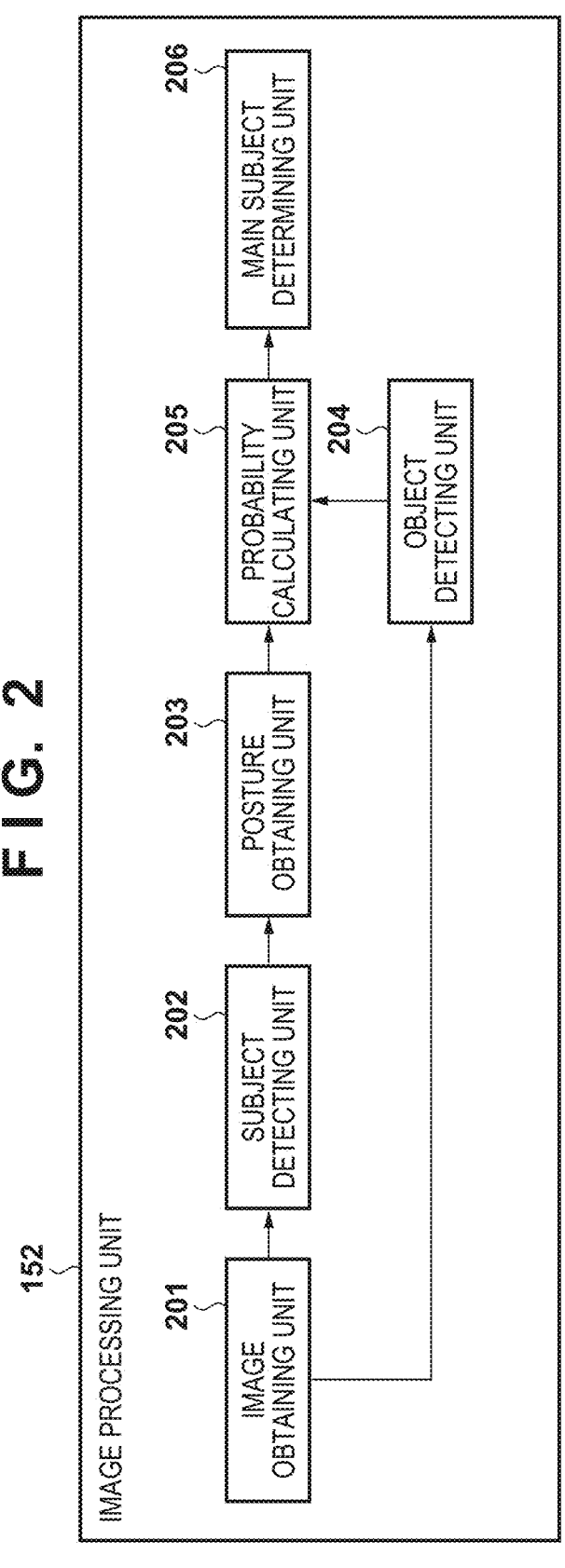
FIG. 2 is a block diagram illustrating, in detail, part of the configuration of an image processing unit 152 according to a first embodiment.
Figure 3:
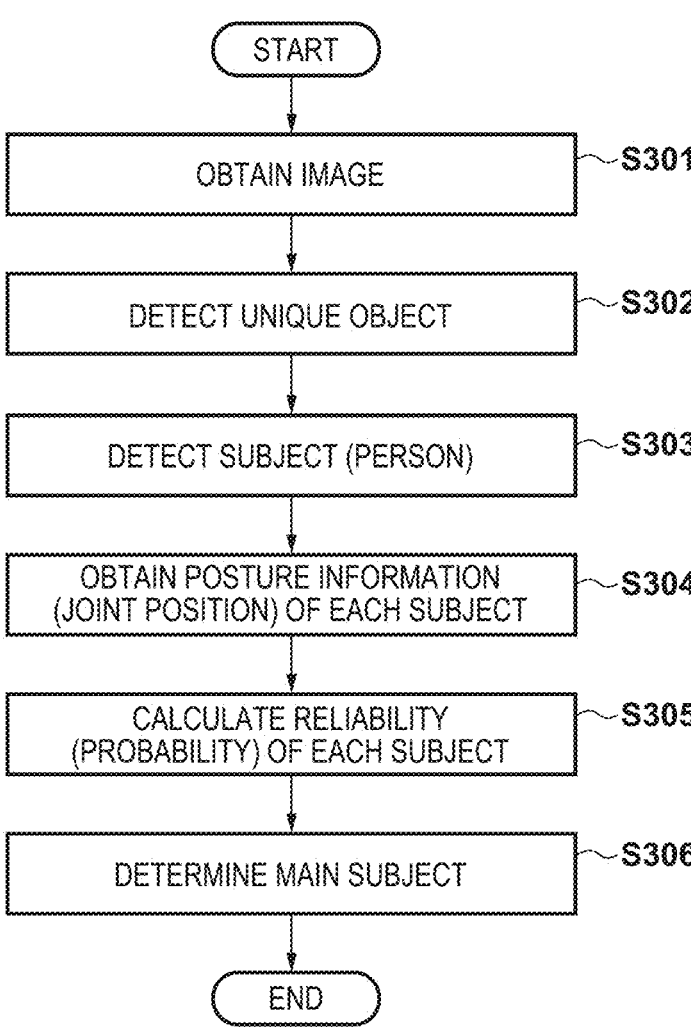
FIG. 3 is a flowchart illustrating main subject determination processing according to the first embodiment.

Main subject determination processing executed by the image processing unit 152 will be described with reference to FIGS. 2 and 3. FIG. 2 is a block diagram illustrating, in detail, part of the configuration of the image processing unit 152. FIG. 3 is a flowchart illustrating the main subject determination processing. Unless otherwise specified, the processes of the respective steps of this flowchart are realized by the various parts of the image processing unit 152 operating under the control of the main control unit 151.

Although the following will describe a ball game played by a plurality of persons as a shooting scene to be subjected to the main subject determination processing, the shooting scene to which the present embodiment can be applied is not limited thereto.

In step S301, an image obtaining unit 201 obtains, from the image capturing control unit 143, an image captured at a time of interest. In step S302, an object detecting unit 204 detects the unique object (an object of a predetermined type) in the image obtained by the image obtaining unit 201, and obtains two-dimensional coordinates, the size, and the like of the unique object in the image. The type of the unique object to be detected is determined on the basis of the shooting scene in the image. Here, the shooting scene is a ball game, and thus it is assumed that the object detecting unit 204 detects a ball as the unique object.

In step S303, a subject detecting unit 202 detects a subject (a person) in the image obtained by the image obtaining unit 201. In step S304, a posture obtaining unit 203 obtains the posture information by estimating the posture of each of a plurality of subjects detected by the subject detecting unit 202. The content of the posture information to be obtained is determined in accordance with the type of the subject. Here, the subject is a person, and thus it is assumed that the posture obtaining unit 203 obtains the positions of a plurality of joints of the person serving as the subject.

A variety of methods can be used for the object detection and posture estimation, such as, for example, the methods described in the following documents 1 and 2, respectively.

Document 1: Redmon, Joseph, et al., "You Only Look Once: Unified, Real-Time Object Detection", Proceedings of the IEEE conference on computer vision and pattern recognition, 2016, Pages: 779-788, Volume: 1, DOI Bookmark: 10.1109/CVPR.2016.91.

Document 2: Cao, Zhe, et al., "Realtime Multi-person 2D Pose Estimation Using Part Affinity Fields", Proceedings of the IEEE Conference on Computer Vision and Pattern Recognition, 2017, Pages: 1302-1310, Volume: 1, DOI Bookmark: 10.1109/CVPR.2017.143.

Figure 4A:
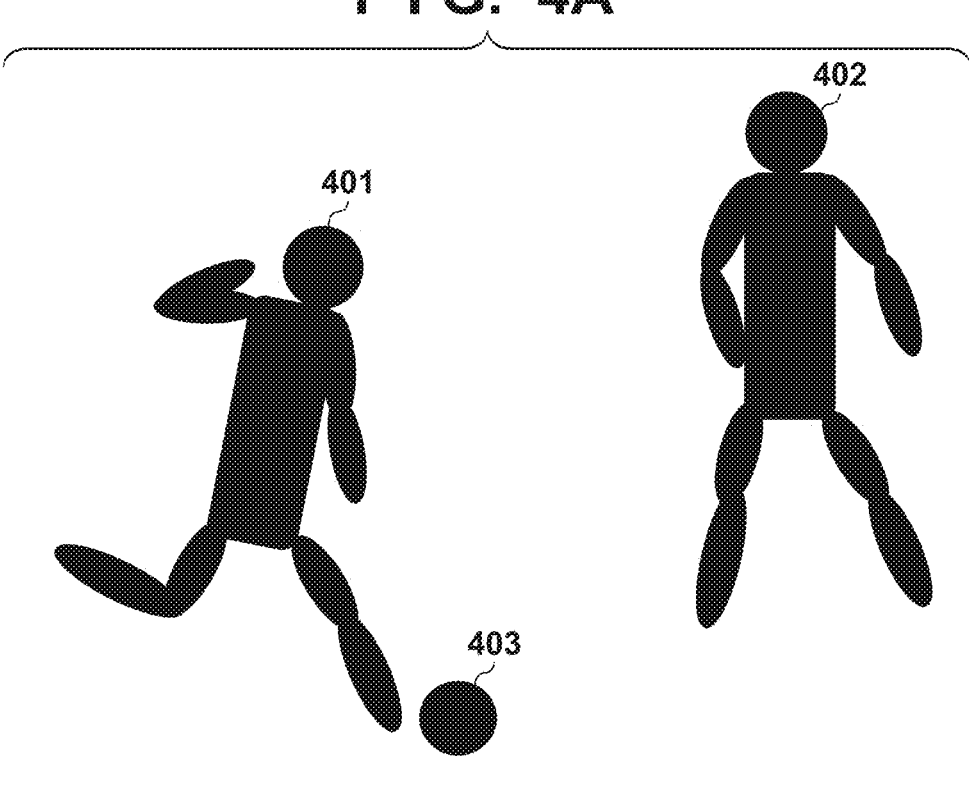
FIGS. 4A to 4B are conceptual diagrams illustrating information obtained by a posture obtaining unit 203 and an object detecting unit 204.
Figure 4B:
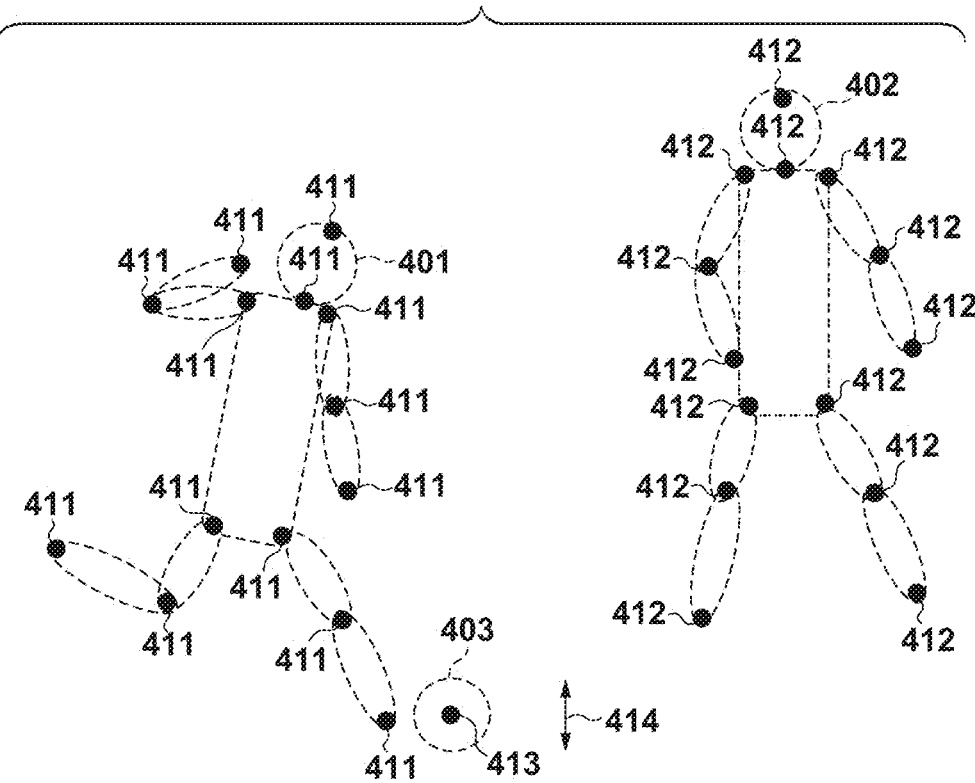

FIGS. 4A to 4B are conceptual diagrams illustrating information obtained by the posture obtaining unit 203 and the object detecting unit 204. FIG. 4A illustrates an image to be processed, in which a subject 401 is about to kick a ball 403. The subject 401 is an important subject in the shooting scene. In the present embodiment, a main subject which is likely to be intended by the user to be the target of image capturing control is determined by using the posture information of the subject and the information of the unique object. On the other hand, a subject 402 is a non-main subject. Here, "non-main subject" is assumed to indicate a subject aside from the main subject.

FIG. 4B is a diagram illustrating an example of the posture information of the subjects 401 and 402, and the position and size of the ball 403. Joints 411 represent the joints of the subject 401, and joints 412 represent the joints of the subject 402. FIG. 4B illustrates an example in which the positions of the top of the head, the neck, the shoulders, the elbows, the wrists, the hips, the knees, and the ankles are obtained as the joints. However, only some of these positions, or other positions, may be obtained as the joint positions. In addition to the joint positions, information such as axes connecting joints to each other may also be used, and any information can be used as the posture information as long as that information expresses the posture of the subject. The following will describe a case where the joint positions are obtained as the posture information.

The posture obtaining unit 203 obtains the two-dimensional coordinates (x,y) of the joints 411 and the joints 412 in the image. Here, the unit of (x,y) is pixels. A centroid position 413 represents the position of the centroid of the ball 403, and an arrow 414 represents the size of the ball 403 in the image. The object detecting unit 204 obtains the two-dimensional coordinates (x,y) of the position of the centroid of the ball 403 in the image, and a number of pixels expressing the width of the ball 403 in the image.

The descriptions will now return to FIG. 3. In step S305, a probability calculating unit 205 calculates a reliability (probability) expressing how much each subject is likely to be a main subject, on the basis of at least one of the joint coordinates estimated by the posture obtaining unit 203 and the coordinates and side of the unique object obtained by the object detecting unit 204. The method for calculating the probability will be described later. The present embodiment will describe a case where the probability that a subject is the main subject in the image being processed is used as the reliability expressing the likelihood to be a main subject (a reliability corresponding to the likelihood that a subject is the main subject in the image being processed). However, a value aside from a probability may be used instead. For example, the inverse of a distance between the centroid position of a subject and a centroid position of the unique object can be used as the reliability.

In step S306, a main subject determining unit 206 determines that the subject having the highest probability among the subjects (persons) detected by the subject detecting unit 202 is the main subject. Then, the main subject determining unit 206 stores the coordinates of the joints of the main subject and representative coordinates expressing the main subject (the centroid position, the position of the face, or the like) in the RAM 154. This completes the main subject determination processing.

The foregoing describes a case where the main subject is determined using the posture information from a single frame. However, a configuration may be employed in which the main subject is determined by loading consecutive frames or a moving image and then calculating the probability using posture information in time series. When using posture information in time series, joint position information from each of points in time may be used, or joint position information from a given point in time may be used in combination with information of a motion vector of a joint or the subject. Any other information may be used as well as long as it expresses information in time series.

Probability Calculation Method

A method through which the probability calculating unit 205 calculates the probability expressing the likelihood to be a main subject on the basis of the coordinates of each joint and the coordinates and size of the unique object will be described next. The following will describe a case where a neural network, which is one method of machine learning, is used.

Figure 5:
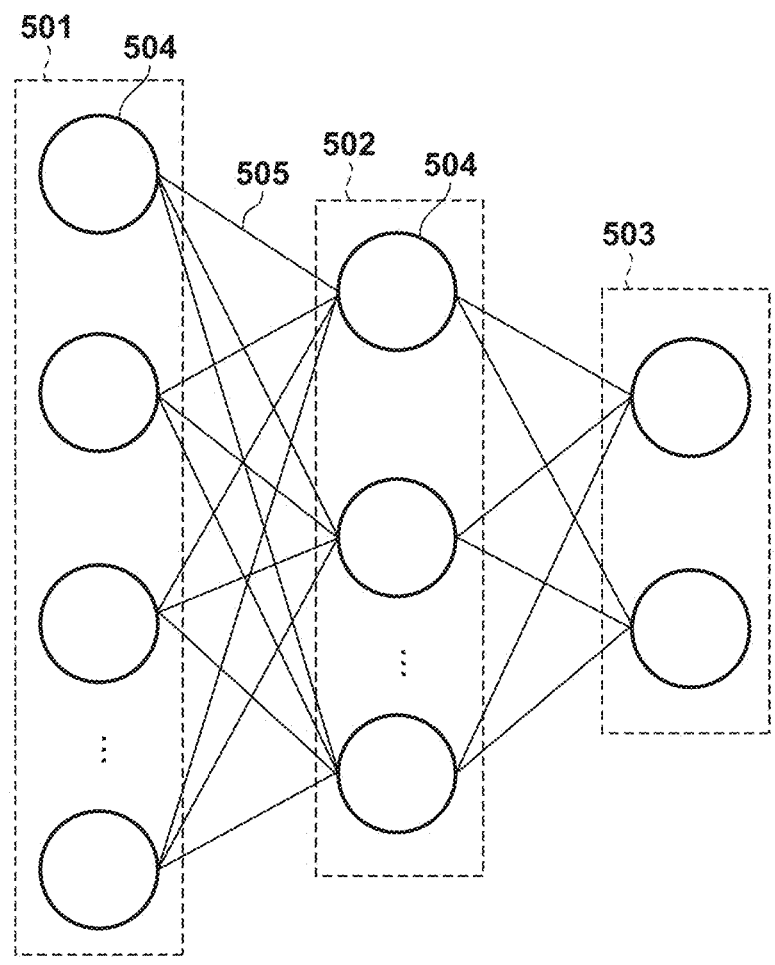
FIG. 5 is a diagram illustrating an example of the structure of a neural network.

FIG. 5 is a diagram illustrating an example of the structure of a neural network. In FIG. 5, 501 represents an input layer; 502, an intermediate layer; 503, an output layer; 504, neurons; and 505, the connection relationships among the neurons 504. For illustrative purposes, only representative neurons and connection lines are numbered here. It is assumed that the number of neurons 504 in the input layer 501 is equal to the dimension of the data to be input, and that the number of neurons in the output layer 503 is 2. This indicates a two-class classification problem that determines whether or not the subject is the main subject.

A line 505 connecting the i-th neuron 504 in the input layer 501 and the j-th neuron 504 in the intermediate layer 502 is given a weight $w_{ij}$, and a value $z_j$ output by the j-th neuron 504 in the intermediate layer 502 is given by the following formula.

$$z_j = h\left(b_j + \sum_i w_{ji}x_i\right) \quad (1)$$

$$h(z) = \max(z, 0) \quad (2)$$

In formula (1), $x_i$ represents the value input to the i-th neuron 504 of the input layer 501. The sum is assumed to be found for all the neurons 504 of the input layer 501 that are connected to the j-th neuron. $b_j$ is called the bias, and is a parameter that controls how easily the j-th neuron 504 fires. The function h defined in formula (2) is an activation function called ReLU (Rectified Linear Unit). Another function, such as a sigmoid function, can be used as the activation function as well.

A value $y_k$, which is output by the k-th neuron 504 of the output layer 503, is given by the following formula.

$$y_k = f\left(b_k + \sum_j w_{kj}z_j\right) \quad (3)$$

$$f(y_k) = \frac{\exp(y_k)}{\sum_i \exp(y_i)} \quad (4)$$

In formula (3), $z_j$ represents the value output by the j-th neuron 504 of the intermediate layer 502, and is i,k=0,1. 0 corresponds to the non-main subject and 1 corresponds to the main subject. The sum is assumed to be found for all the neurons of the intermediate layer 502 that are connected to the k-th neuron. The function f, defined in formula (4), is called a soft-max function, and outputs a probability value indicating a probability of belonging to a k-th class. In the present embodiment, $f(y_1)$ is used as the probability expressing the likelihood to be a main subject.

During training, the coordinates of the joints of the subject and the coordinates and size of the unique object are input. Then, all weights and biases are optimized so as to minimize a loss function using the output probability and a "correct" label. Here, the "correct" label is assumed to take two values, namely "1" for a main subject and "0" for a non-main subject. As a loss function L, binary cross entropy such as that indicated below can be used.

$$L(y, t) = -\sum_m t_m \log y_m - \sum_m (1 - t_m)\log(1 - y_m) \quad (5)$$

In formula (5), the subscript m represents an index of a subject to be used in the training. $y_m$ represents the probability value output from the neuron 504 of k=1 in the output layer 503, and $t_m$ represents the "correct" label. In addition to that indicated by formula (5), the loss function can be any function, such as the mean square error, as long as the function can measure a degree to which the value matches the "correct" label. By optimizing on the basis of formula (5), the weights and biases can be determined so that the "correct" label and the output probability value approach each other.

The learned weights and bias values are stored in advance in the flash memory 155, and are also stored in the RAM 154 as needed. Multiple types of weights and bias values may be provided, depending on the scene. The probability calculating unit 205 outputs the probability value $f(y_1)$ on the basis of formulas (1) to (4), using the learned weights and biases (the result of machine learning performed in advance).

During training, a state prior to a transition to an important action can be learned as the state of the main subject. For example, when kicking a ball, a state in which a subject is swinging their leg to kick the ball can be learned as one of the states of the main subject. The reason for employing this configuration is that it is necessary to control the image capturing apparatus 100 precisely when the main subject actually takes an important action. For example, starting control for automatically recording images and video (recording control) when the reliability (probability value) corresponding to the main subject exceeds a pre-set threshold makes it possible for the user to shoot images without missing important moments. At this time, information on the typical time taken from the state to be learned to when the important action occurs may be used to control the image capturing apparatus 100.

Although the foregoing has described a method for calculating the probability using a neural network, another machine learning method, such as a support vector machines or a decision tree, can be used as long as a class classification of whether or not a subject is a main subject is possible. Furthermore, the method is not limited to machine learning, and a function that outputs a reliability or probability value on the basis of a given model may be constructed as well. As described with reference to FIG. 3 as well, it is also possible to use the value of a monotone decreasing function for the distance between the subject and the unique object, under the assumption that a lower distance between the subject and the unique object indicates a higher reliability that the subject is the main subject.

With reference to FIG. 3, the main subject is described as being determined using information of the unique object as well, but it is also possible to determine the main subject using only the posture information of the subject. Furthermore, data obtained by subjecting the position, size, and so on of the joint positions, the unique object, and the like to a predetermined transformation, such as a linear transformation, may be used as input data as well.

As described thus far, according to the first embodiment, the image capturing apparatus 100 obtains the posture information for each of a plurality of subjects detected from an image being processed. Then, for each of the plurality of subjects, the image capturing apparatus 100 calculates a reliability, corresponding to the likelihood that the subject is the main subject in the image being processed, on the basis of the posture information. Then, on the basis of the plurality of reliabilities calculated for the plurality of subjects, the image capturing apparatus 100 determines the main subject in the image being processed from the plurality of subjects. This makes it possible to determine a main subject which is highly likely to match a user's intentions in an image where a plurality of subjects are present.

Second Embodiment

In the first embodiment, if there is error in the obtainment of the posture information, there is a missing value, or the like, it may not be possible to accurately calculate the probability value, leading to a drop in the probability value. It is also conceivable that a plurality of subjects having probabilities close to the maximum probability value will be present. In such a case, if the subject having the maximum probability is simply determined to be the main subject, the determination accuracy may decrease.

Accordingly, the second embodiment will describe a configuration in which when it is difficult to accurately determine the main subject using only the probability value, another method is used in combination with the aforementioned method to increase the accuracy of determining the main subject. In the second embodiment, the basic configuration of the image capturing apparatus 100 is the same as in the first embodiment (see FIG. 1). The following will primarily describe areas that are different from the first embodiment.

Figure 6:
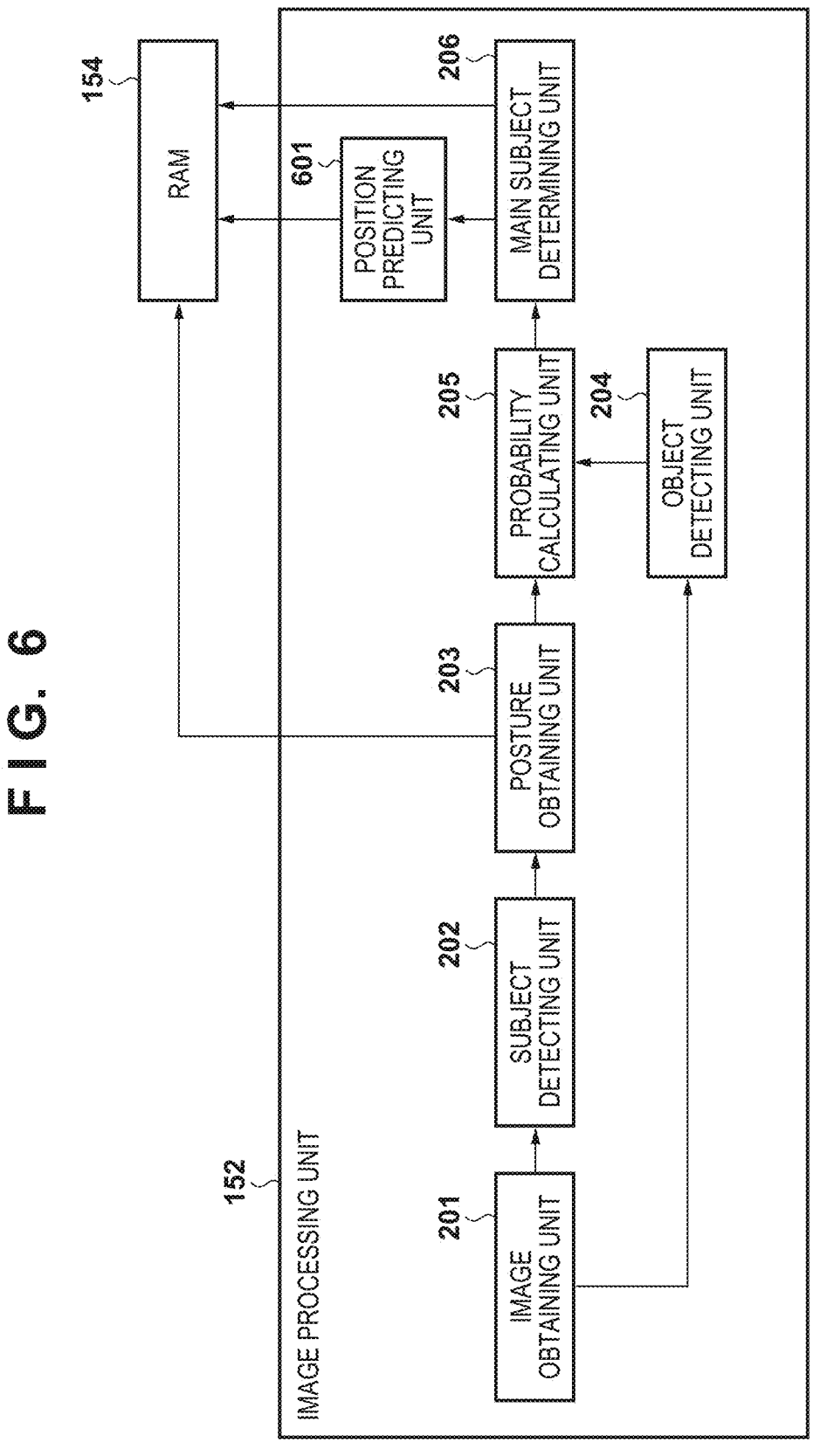
FIG. 6 is a block diagram illustrating, in detail, part of the configuration of the image processing unit 152 according to a second embodiment.

Main subject determination processing executed by the image processing unit 152 according to the second embodiment will be described with reference to FIGS. 3, 6, and 7. FIG. 6 is a block diagram illustrating, in detail, part of the configuration of the image processing unit 152 according to the second embodiment. The main subject determination processing according to the second embodiment is the same as in the first embodiment, with the exception of the processing of step S306 in FIG. 3. FIG. 7 is a flowchart illustrating, in detail, the processing of step S306 in FIG. 3, according to the second embodiment. Unless otherwise specified, the processes of the respective steps of this flowchart are realized by the various parts of the image processing unit 152 operating under the control of the main control unit 151.

In step S701, the main subject determining unit 206 uses a predetermined threshold Th1 to determine whether or not a subject having a probability exceeding the threshold Th1 is present. 0.7 can be set as the threshold Th1, for example. If a subject having a probability exceeding the threshold Th1 is present, the sequence moves to step S702, and if not, the sequence moves to step S705.

In step S702, the main subject determining unit 206 obtains a maximum value of the probability and takes that maximum value as M. In step S703, the main subject determining unit 206 determines whether or not there are two or more subjects having a probability for which the absolute value of the difference from M is less than a threshold Th2 (less than a second threshold). 0.05 can be set as the threshold Th2, for example. If there are two or more subjects having a probability for which the absolute value of the difference from M is less than the threshold Th2 (i.e., if there are a plurality of reliabilities for which the absolute value of the difference from the maximum value M is less than the threshold Th2), the sequence moves to step S705. If not (i.e., if there is only one such subject), the sequence moves to step S704. Note that a subject having the maximum value M as the reliability (probability) is also treated as a subject having a probability for which the absolute value of the difference from M is less than the threshold Th2.

In step S704, the main subject determining unit 206 determines that the subject having M as the probability value is the main subject.

A case where the sequence has moved from step S701 or step S703 to step S705 will be described next. In step S705, a position predicting unit 601 loads, from the RAM 154, positions $P_1$ and $P_2$ of the main subject from one frame and two frames before a frame of interest (the image being processed), respectively, and predicts the position of the main subject in the frame of interest. Here, $P_1$ and $P_2$ represent coordinate vectors in the image, and it is assumed that a position representing the subject, calculated from the joint position information, is stored. Although the centroid position is used as the representative position here, another value may be used instead. Assuming that the main subject is moving at a constant velocity, the predicted position can be calculated through the following formula.

$$P = P_1 + (P_1 - P_2) \qquad (6)$$

In addition to the method using formula (6), a method may be used in which, for example, main subject information is loaded from a plurality of past frames (a plurality of images shot before the image being processed), and the prediction is made by taking into account acceleration and the like.

In step S706, the main subject determining unit 206 determines the main subject on the basis of the predicted position of the main subject, calculated by the position predicting unit 601. For example, the main subject determining unit 206 determines that the subject having a centroid position which is closest to the predicted position calculated by the position predicting unit 601 in the frame of interest is the main subject.

Note that the values of the thresholds Th1 and Th2 may be switched in accordance with the type of a shooting mode set in the image capturing apparatus 100. This makes it possible to reflect the user's intentions regarding whether they wish to track the same subject in a more stable manner or switch to tracking a subject with even a slightly higher likelihood of being the main subject. For example, increasing the value of the threshold Th1 or Th2 makes it more likely that the main subject will be selected on the basis of the predicted position from formula (6), which increases the tendency for the same subject to be tracked. On the other hand, reducing the values of the thresholds Th1 and Th2 makes it more likely that the subject with the greatest probability will be selected, which increases the tendency to switch to and track a subject which has even a slightly higher probability of being the main subject.

Additionally, although the example of FIG. 7 illustrates a configuration in which the main subject is determined using the predicted position in step S706, another benchmark for the determination may be used, such as selecting the subject closest to the center of the screen (the center of the image being processed). The determination may also be made using other information, such as the color of the subject's clothing.

As described thus far, according to the second embodiment, the image capturing apparatus 100 determines the main subject on the basis of the predicted position of the main subject in the image being processed when there is no subject for which the reliability exceeds the threshold Th1 or when there are a plurality of reliabilities for which the absolute value of the difference from the maximum reliability is less than the threshold Th2. The accuracy of the main subject determination can be increased as a result.

Third Embodiment

The third embodiment will describe a configuration in which the main subject is determined having limited the region to be processed so as to accelerate the processing. In the third embodiment, the basic configuration of the image capturing apparatus 100 is the same as in the first embodiment (see FIG. 1). Additionally, the basic configuration of the image processing unit 152 may be the same as in the first embodiment, or may be the same as in the second embodiment (see FIGS. 2 and 6). The following will primarily describe areas that are different from the first and second embodiments.

Figure 8:
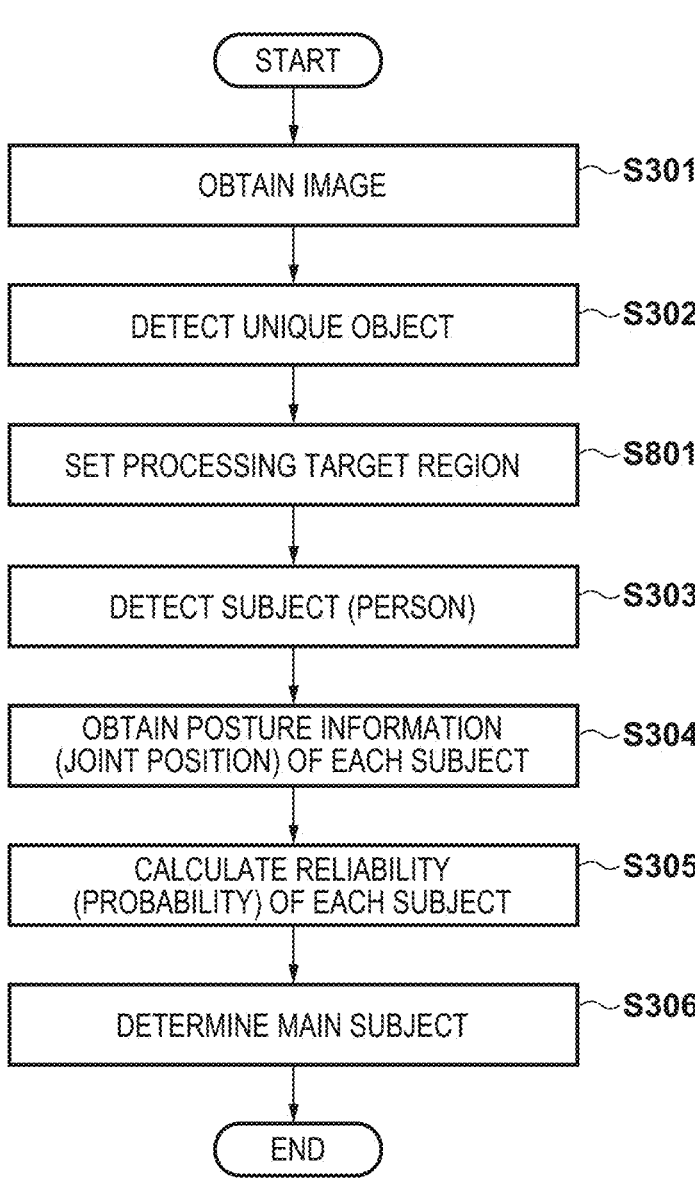
FIG. 8 is a flowchart illustrating main subject determination processing according to a third embodiment.

FIG. 8 is a flowchart illustrating main subject determination processing according to the third embodiment. Unless otherwise specified, the processes of the respective steps of this flowchart are realized by the various parts of the image processing unit 152 operating under the control of the main control unit 151.

In step S801, the image processing unit 152 sets (limits) a region to be processed (a determination target region of the main subject) on the basis of the position of the unique object detected by the object detecting unit 204. For example, a square region centered on the position of the unique object can be used as the determination target region. The size of the square may be determined in any manner as long as the square contains several subjects in the image.

The processing of steps S303 and on is the same as that in the first embodiment or the second embodiment, except that the processing is carried out not on the subjects in the entire image, but rather on subjects present in the region set as the determination target region. This makes it possible to lighten the processing load of the main subject determination processing.

Note that the present embodiment does not exclude a configuration in which some of the processing of steps S303 and on is performed on subjects outside of the determination target region. In other words, in the present embodiment, at least a plurality of subjects present in the determination target region are subjected to the processing of steps S303 and on, and the main subject is ultimately determined from the plurality of subjects present in the determination target region. Any additional processing performed on the subjects outside the determination target region is not particularly limited. For example, a configuration may be employed in which processing for detecting subjects from the entire image is performed in step S303, and the processing of steps S304 and on is performed on a plurality of subjects, among all the subjects which have been detected, that are present in the determination target region. The processing load of the main subject determination processing can be lightened to a certain extent in such a case as well.

Furthermore, the present embodiment may employ a configuration in which the determination target region is set on the basis of the predicted position of the main subject, instead of the processing of step S801. The method described in the second embodiment with reference to step S705 of FIG. 7 can be used as the method for determining the predicted position of the main subject.

As described thus far, according to the third embodiment, the image capturing apparatus 100 sets a determination target region for the main subject on the basis of the position of the unique object or the predicted position of the main subject. This makes it possible to lighten the processing load of the main subject determination processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-196616, filed Oct. 29, 2019 which is hereby incorporated by reference herein in its entirety.

What is claimed is:

1. A main subject determining apparatus comprising at least one processor and/or at least one circuit which functions as:

a subject detecting unit configured to detect a plurality of subjects from a first image;

an obtaining unit configured to obtain posture information of each of the plurality of subjects; and a determining unit configured to determine, as a main subject of the first image, one of the plurality of subjects on the basis of the posture information of each of the plurality of subjects using a machine learning model learned by a decision tree, wherein the determining unit determines whether or not the plurality of subjects include a subject having a reliability that exceeds a first threshold, and wherein the determining unit changes the first threshold in accordance with a type of a shooting mode set in an image capturing apparatus that uses information of the main subject of the first image.

2. The main subject determining apparatus according to claim 1, wherein the subject detecting unit detects a plurality of persons as the plurality of subjects; and the obtaining unit obtains positions of a plurality of joints of each of the persons.

3. The main subject determining apparatus according to claim 1, wherein the at least one processor and/or at least one circuit further functions as:

an object detecting unit configured to detect, from the first image, an object of a predetermined type that is different from the plurality of subjects; and a calculating unit configured to calculate, for each of the plurality of subjects, a reliability on the basis of the posture information of the subject and at least one of a position and a size of the object, wherein the determining unit determines the main subject of the first image from among the plurality of subjects on the basis of the plurality of reliability calculated for the plurality of subjects.

4. The main subject determining apparatus according to claim 3, wherein the object detecting unit detects an object of a type determined on the basis of a shooting scene of the first image as the object of the predetermined type.

5. The main subject determining apparatus according to claim 3, wherein the at least one processor and/or at least one circuit further functions as:

a setting unit configured to set a determination target region of the main subject in the first image on the basis of a position of the object, wherein the plurality of subjects are subjects present in the determination target region.

6. The main subject determining apparatus according to claim 1, wherein the at least one processor and/or at least one circuit further functions as:

a predicting unit configured to predict a position of the main subject in the first image on the basis of a position of a main subject in a plurality of images which are earlier than the first image in time series; and a setting unit configured to set a determination target region of the main subject in the first image on the basis of the predicted position, wherein the plurality of subjects are subjects present in the determination target region.

7. The main subject determining apparatus according to claim 1, wherein the at least one processor and/or at least one circuit further functions as:

a predicting unit configured to predict a position of the main subject in the first image on the basis of a position of a main subject in a plurality of images which are earlier than the first image in time series, wherein when the plurality of subjects do not include a subject having a reliability that exceeds the first threshold, the determining unit determines the main subject of the first image on the basis of the predicted position.

8. The main subject determining apparatus according to claim 1, wherein the at least one processor and/or at least one circuit further functions as:

a predicting unit configured to predict a position of the main subject in the first image on the basis of a position of a main subject in a plurality of images which are earlier than the first image in time series; and a calculating unit configured to, for each of the plurality of subjects, a reliability corresponding to a likelihood that the subject is a main subject on the basis of the posture information of the subject, wherein the determining unit obtains a maximum value of the plurality of reliabilities calculated for the plurality of subjects, and determines whether or not the plurality of reliabilities include a plurality of reliabilities for which an absolute value of a difference from the maximum value is less than a second threshold; and when the plurality of reliabilities include a plurality of reliabilities for which an absolute value of a difference from the maximum value is less than the second threshold, the determining unit determines the main subject of the first image on the basis of the predicted position.

9. The main subject determining apparatus according to claim 8, wherein the determining unit changes the second threshold in accordance with a type of a shooting mode set in an image capturing apparatus that uses information of the main subject of the first image.

10. The main subject determining apparatus according to claim 1, wherein the at least one processor and/or at least one circuit further functions as:

a calculating unit configured to, for each of the plurality of subjects, a reliability corresponding to a likelihood that the subject is a main subject on the basis of the posture information of the subject, wherein the determining unit obtains a maximum value of the plurality of reliabilities, and determines whether or not the plurality of reliabilities include a plurality of reliabilities for which an absolute value of a difference from the maximum value is less than a second threshold; and when the plurality of reliabilities include a plurality of reliabilities for which an absolute value of a difference from the maximum value is less than the second threshold, the determining unit determines, as the main subject of the first image, a subject, among subjects having reliabilities for which an absolute value of the difference from the maximum value is less than the second threshold, that is closest to a center of the first image.

11. The main subject determining apparatus according to claim 1, wherein the at least one processor and/or at least one circuit further functions as:

a calculating unit configured to, for each of the plurality of subjects, a reliability corresponding to a likelihood that the subject is a main subject on the basis of the posture information of the subject.

12. The main subject determining apparatus according to claim 11, wherein the calculating unit calculates the reliability on the basis of a result of machine learning performed in advance.

13. The main subject determining apparatus according to claim 11, wherein on the basis of the plurality of reliabilities, the determining unit determines, as the main subject of the first image, a subject, among the plurality of subjects, that is most likely to be the main subject of the first image.

14. The main subject determining apparatus according to claim 1, wherein the obtaining unit obtains posture information of each of the plurality of subjects by obtaining positions of a plurality of joints of each of the plurality of subjects.

15. An image capturing apparatus, comprising:

the main subject determining apparatus according to claim 1; and an image sensor, wherein the first image is an image captured by the image sensor.

16. The image capturing apparatus according to claim 15, wherein the at least one processor and/or at least one circuit further functions as:

a calculating unit configured to, for each of the plurality of subjects, a reliability corresponding to a likelihood that the subject is a main subject on the basis of the posture information of the subject; and a recording control unit configured to, when the reliability corresponding to the main subject of the first image determined by the determining unit exceeds a third threshold, perform control to start a process of recording an image captured by the image sensor into a recording medium.

17. The image capturing apparatus according to claim 15, wherein the at least one processor and/or at least one circuit further functions as:

an image capturing control unit configured to perform image capturing control of the image sensor on the basis of information of the main subject of the first image determined by the determining unit.

18. A main subject determining method executed by a main subject determining apparatus, comprising:

detecting a plurality of subjects from a first image;

obtaining posture information of each of the plurality of subjects; and determining, as a main subject of the first image, one of the plurality of subjects on the basis of the posture information of each of the plurality of subjects using a machine learning model learned by a decision tree, wherein the determining:

determines whether or not the plurality of subjects include a subject having a reliability that exceeds a first threshold, and changes the first threshold in accordance with a type of a shooting mode set in an image capturing apparatus that uses information of the main subject of the first image.

19. A non-transitory computer-readable storage medium which stores a program for causing a computer to execute a main subject determining method comprising:

detecting a plurality of subjects from a first image;

obtaining posture information of each of the plurality of subjects; and determining, as a main subject of the first image, one of the plurality of subjects on the basis of the posture information of each of the plurality of subjects using a machine learning model learned by a decision tree, wherein the determining:

determines whether or not the plurality of subjects include a subject having a reliability that exceeds a first threshold, and changes the first threshold in accordance with a type of a shooting mode set in an image capturing apparatus that uses information of the main subject of the first image.

20. An image capturing apparatus comprising:

an image sensor;

at least one processor and/or at least one circuit which functions as:

a subject detecting unit configured to detect a plurality of persons from a first image;

an obtaining unit configured to obtain posture information of each of the plurality of persons;

a determining unit configured to determine, as a main subject of the first image, one of the plurality of persons on the basis of the posture information of each of the plurality of persons using a machine learning model learned by a decision tree, wherein the determining unit determines whether or not the plurality of persons include a person having a reliability that exceeds a first threshold, and wherein the determining unit changes the first threshold in accordance with a type of a shooting mode set in the image capturing apparatus that uses information of the main subject of the first image.

* * * * *